No. 782,296.   PATENTED FEB. 14, 1905.
W. WEBBER.
GUARD FOR HARVESTERS.
APPLICATION FILED JUNE 22, 1903.

Witnesses:
Frank Blanchard
Chas. W. Chambers.

Inventor:
William Webber.
By R. B. Swift.
Attorney.

No. 782,296. Patented February 14, 1905.

UNITED STATES PATENT OFFICE.

WILLIAM WEBBER, OF CHICAGO, ILLINOIS, ASSIGNOR TO INTERNATIONAL HARVESTER COMPANY, OF CHICAGO, ILLINOIS, A CORPORATION OF NEW JERSEY.

GUARD FOR HARVESTERS.

SPECIFICATION forming part of Letters Patent No. 782,296, dated February 14, 1905.

Application filed June 22, 1903. Serial No. 162,516.

*To all whom it may concern:*

Be it known that I, WILLIAM WEBBER, a citizen of the United States, residing at Chicago, in the county of Cook and State of Illinois, have invented certain new and useful Improvements in Guards for Harvesters, of which the following is a specification sufficiently clear to enable those skilled in the art to which it appertains to make and use the same.

The invention relates to guards for harvesters and like machines.

It has for its object to provide means for interlocking adjacent guards for the purpose of maintaining their alinement, which, as herein shown, consists in so constructing the wings in advance of the finger-bar, with which guards are usually provided, that they will interlock or overlap.

The invention is illustrated in the accompanying drawings, forming a part of this specification, in which like letters of reference designate like parts.

Figure 1:
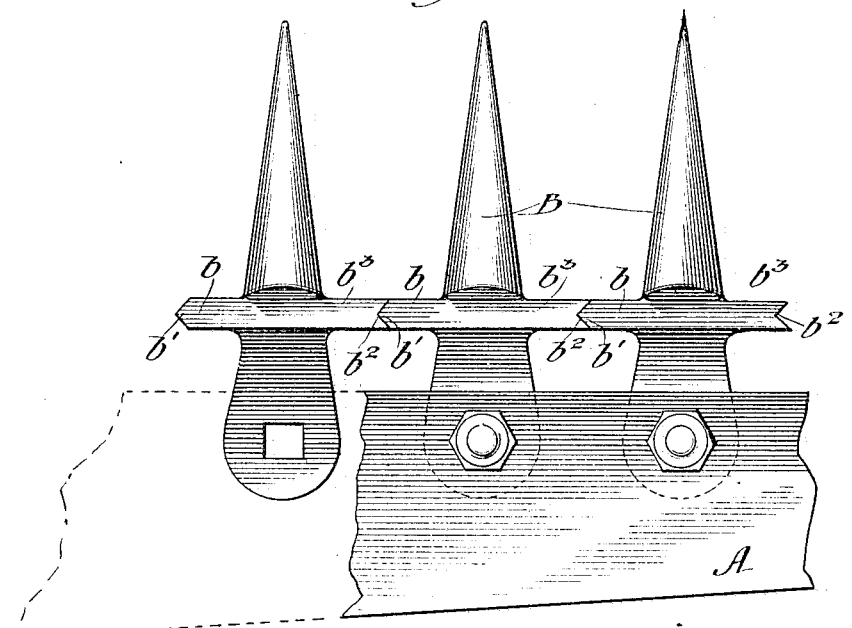
Figure 2:
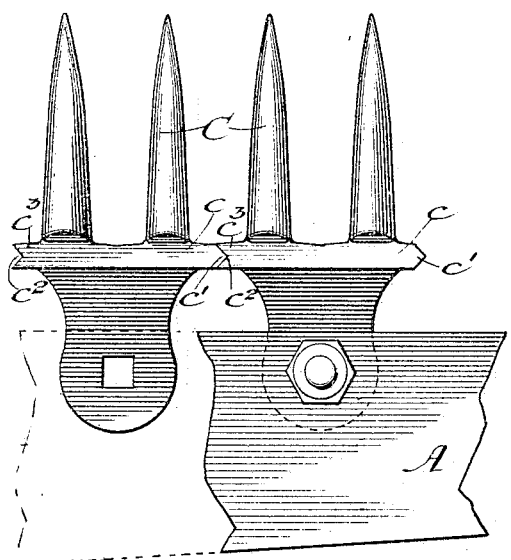
Figure 3:
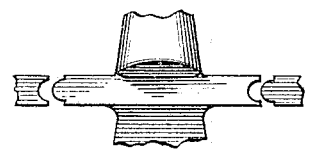
Figure 4:
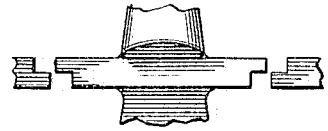
Figure 5:
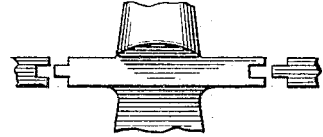

Referring to the drawings, Figure 1 is a plan view of a fragment of a finger-bar which is provided with guards of the above-described type. Fig. 2 is a plan view similar to Fig. 1, showing the invention as applied to a guard having a plurality of fingers. Figs. 3, 4, and 5 are fragmentary plan views of guards, showing some of the modified forms of the embodiment of the invention.

In this specification and in the claims the term "guard" is used and is to be interpreted as meaning a guard-section which is individually secured to the finger-bar regardless of the number of fingers with which it may be provided. Such a guard-section is shown in Fig. 1 as having one finger and in Fig. 2 as having two. Any desired number of fingers might be added without modifying the invention.

There have been heretofore a great variety of means devised for maintaining the alinement of guards. The common form consists of an offset, rib, or flange in one part with the rear portion of the guard, by which it is secured to the finger-bar, which rib contacts with the front edge of the finger-bar for the purpose. The abutting wings which form a continuous way for the cutter-bar to slide upon form an additional means in common use. If the guards are cast of malleable iron, as is the common practice, their design within certain limits is of little consequence as far as expense of manufacture is concerned. In case, however, they are drop-forged it is desirable, if not imperative, that their form be as simple as possible in order to keep down the cost of making and maintaining the dies and the consequent cost of the product. It was with this object in view that the guards illustrated in the drawings were designed. It was found that the form of the guard could be much simplified if the rib above referred to were removed. This could not wisely be done, however, without providing some other means for insuring the alinement and rigidity of the guards, as the usual guard-wings in advance of the finger-bar, which simply abut against the wings of the adjacent guard, were not sufficient. The desired result was accomplished by devising an interlocking guard-wing, thus making possible a drop-forged steel guard which could be made cheaply enough to be practical.

Referring to the drawings, A represents a fragment of a finger-bar to which the guards B and C are secured in the usual manner. The guard-wings $b$ and $c$ are provided with projections $b'$ and $c'$, respectively, which enter corresponding notches, recesses, or cavities $b^2$ and $c^2$, provided in the guard-wings $b^3$ and $c^3$, respectively. In using a guard of this type the wings of the inner and outer shoes will of course have to be provided with a corresponding projection or recess, as the case may be, to interlock with the wing of the adjacent guard.

It is evident that both wings of the guard might be provided with a projection adapted to enter corresponding recesses in the wings of the adjacent guards without departing from the spirit of the invention. In this instance each alternate guard only would be alike instead of every one, which would only result in a useless increase in the expense of manufacture.

A number of modifications of the invention readily suggest themselves, a few of which are shown in Figs. 3, 4, and 5. Fig. 4 shows a form like that above referred to, in which each alternate guard only would be alike.

The invention is readily adapted to guard-sections provided with a plurality of fingers, as above suggested. Hence I do not wish to be limited to its application to a guard-section having a single finger.

Having thus described my invention, what I claim as new, and desire to secure by Letters Patent, is—

1. A harvester-guard provided with means integral therewith in advance of the finger-bar for interlocking with the adjacent guard or shoe to maintain its alinement.

2. A harvester-guard having a projection in advance of the finger-bar provided with means for interlocking with the adjacent guard or shoe to maintain its alinement.

3. A harvester-guard having a wing or wings in advance of the finger-bar provided with means for interlocking with the adjacent guard or guard-wing to maintain its alinement.

4. A harvester-guard having wings, which with the wings of the adjacent guards form a continuous way for the cutter-bar, provided with means for interlocking with the adjacent guard-wings to maintain its alinement.

5. In a harvester-guard, a wing on each side in advance of the finger-bar provided respectively with a projection and a corresponding recess adapted to interlock with the adjacent guard-wings.

6. In a harvester-guard, in combination with a finger-bar, a wing on one side of the guard provided with a projection, and a wing on the opposite side provided with a corresponding recess, said wings being in advance of the finger-bar and said projection and recess in a line parallel with the front edge thereof.

7. The combination of a finger-bar, guards and guard-wings in advance of said finger-bar which terminate alternately in a projection and a corresponding recess respectively, each forming by contact with its fellow a matched joint between said guards.

In testimony whereof I have signed my name to this specification in the presence of two subscribing witnesses.

WILLIAM WEBBER.

Witnesses:
JAMES J. BUTLER,
CHAS. N. CHAMBERS.